(12) United States Patent
Tsuji

(10) Patent No.: US 8,523,434 B2
(45) Date of Patent: Sep. 3, 2013

(54) IMAGE PROCESSING APPARATUS AND IMAGE PROCESSING METHOD FOR REMOVING RESIDUAL IMAGE

(75) Inventor: Tetsuya Tsuji, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 821 days.

(21) Appl. No.: 12/591,923

(22) Filed: Dec. 4, 2009

(65) Prior Publication Data

US 2010/0142791 A1 Jun. 10, 2010

(30) Foreign Application Priority Data

Dec. 5, 2008 (JP) ................................. 2008-310466

(51) Int. Cl.
*G01D 18/00* (2006.01)
*G06K 9/36* (2006.01)

(52) U.S. Cl.
USPC .......................... 378/207; 378/98.12; 382/132

(58) Field of Classification Search
USPC .... 378/19, 42, 98.8, 98.12, 207; 250/370.09; 382/132
See application file for complete search history.

(56) References Cited

U.S. PATENT DOCUMENTS

| | | | | |
|---|---|---|---|---|
| 5,249,123 A * | 9/1993 | Hsieh | ............................... | 378/19 |
| 5,265,013 A * | 11/1993 | King et al. | ........................ | 378/4 |
| 5,331,682 A * | 7/1994 | Hsieh | ............................... | 378/19 |
| 5,359,638 A * | 10/1994 | Hsieh et al. | ........................ | 378/4 |
| 5,517,544 A * | 5/1996 | Levinson | ............................ | 378/4 |
| 6,476,394 B1 | 11/2002 | Amitani et al. | | |
| 6,493,646 B1 * | 12/2002 | Hsieh et al. | ................... | 702/104 |
| 6,621,887 B2 * | 9/2003 | Albagli et al. | ................... | 378/42 |
| 6,751,289 B2 * | 6/2004 | Aoki et al. | .................... | 378/98.7 |
| 6,920,198 B2 * | 7/2005 | Xue et al. | ......................... | 378/62 |
| 7,003,071 B2 * | 2/2006 | Nagaoka et al. | ................ | 378/19 |
| 7,006,599 B2 * | 2/2006 | Okamura et al. | .......... | 378/98.11 |
| 7,073,941 B2 * | 7/2006 | Okamura | ...................... | 378/207 |
| 7,199,389 B2 | 4/2007 | Kuwabara | | |
| 7,277,568 B2 * | 10/2007 | Spahn | .......................... | 382/132 |
| 7,295,652 B2 * | 11/2007 | Ikeda et al. | ................ | 378/98.12 |
| 7,313,218 B2 * | 12/2007 | Okamura et al. | .............. | 378/22 |
| 7,377,691 B2 * | 5/2008 | Okamura et al. | ............. | 378/207 |
| 7,460,643 B2 * | 12/2008 | Okamura | ..................... | 378/98.8 |
| 7,570,735 B2 * | 8/2009 | Konno et al. | ................... | 378/19 |

(Continued)

FOREIGN PATENT DOCUMENTS

JP 61181442 8/1986
JP 2001-149355 6/2001

(Continued)

*Primary Examiner* — Allen C. Ho
(74) *Attorney, Agent, or Firm* — Jean C. Edwards, Esq.; Edwards Neils PLLC

(57) ABSTRACT

An X-ray imaging system is provided with an FPD and an image processing apparatus. The image processing apparatus is provided with a CPU, a coefficient table, an interpolator and a residual image remover. The CPU acquires an image taken with the FPD. A plurality of coefficients each corresponding to a parameter that changes an attenuation curve are previously stored in the coefficient table. The attenuation curve represents time-varying attenuation of a residual image of the previous image. In a case where the coefficient corresponding to a parameter of the present exposure is not contained in the coefficient table, an appropriate coefficient is calculated by interpolation based on the coefficients contained in the coefficient table. The residual image remover calculates the residual image based on the stored coefficient or the calculated coefficient and a time lapse between the previous and subsequent exposures, and removes the residual image from the present image.

11 Claims, 13 Drawing Sheets

(56) References Cited

U.S. PATENT DOCUMENTS

| | | | |
|---|---|---|---|
| 7,668,361 B2 * | 2/2010 | Spies | 382/132 |
| 7,760,856 B2 * | 7/2010 | Okamura | 378/98.7 |
| 7,787,590 B2 * | 8/2010 | Okamura | 378/62 |
| 7,787,592 B2 * | 8/2010 | Okamura | 378/98.8 |
| 7,792,251 B2 * | 9/2010 | Bacher et al. | 378/98.12 |
| 7,810,997 B2 * | 10/2010 | Okamura | 378/207 |
| 7,822,178 B2 * | 10/2010 | Enomoto | 378/91 |
| 8,084,744 B2 * | 12/2011 | Enomoto | 250/370.09 |

FOREIGN PATENT DOCUMENTS

| | | |
|---|---|---|
| JP | 2005-283798 | 10/2005 |
| JP | 2006-135748 | 5/2006 |
| JP | 2007-256981 | 10/2007 |
| JP | 2008-167846 | 7/2008 |

\* cited by examiner

IMAGE PROCESSING APPARATUS AND IMAGE PROCESSING METHOD FOR REMOVING RESIDUAL IMAGE

CROSS-REFERENCE TO RELATED APPLICATIONS

The present application claims priority from Japanese Patent Application No. 2008-310466, filed Dec. 5, 2008, the contents of which are herein incorporated by reference in their entirety.

FIELD OF THE INVENTION

The present invention relates to an image processing apparatus and an image processing method for removing a residual image from an image.

BACKGROUND OF THE INVENTION

X-ray imaging systems are widely used in the medical field. The X-ray imaging system takes images of an internal structure a patient (subject) using X-ray. Absorption and scattering rates of X-rays vary depending on the organs and the thickness of the body of a patient. X-ray attenuates while it passes through the patient, reflecting the internal structure of the patient. In a conventional X-ray imaging system, a patient is placed between an X-ray source and a film to which a photosensitive agent is applied, and X-ray which passed through the patient is recorded on the film. Thus, an X-ray image of an internal structure of the patient is taken.

Recently, CR (computed radiography) devices have come into widespread use. In place of an X-ray film, the CR device uses a so-called imaging plate coated with photostimulable phosphor to temporarily record a latent image, and reads the recorded image with laser and digitizes the image. Moreover, digital radiography (DR or DX) devices are becoming available. The DR device converts X-ray, transmitted through the patient, into electric signals in real time and digitizes the image with the use of a flat panel detector (FPD).

The FPD is formed by layering semiconductor material such as amorphous selenium or the like on a large glass substrate, and converts incident X-ray into signal charge. The FPD has sensing elements corresponding to pixels. The signal charge from each pixel is stored in the corresponding sensing element. The signal charge stored in the FPD is output as image signals. The image signals are subjected to various image processing to generate a digital image.

Since the size of the FPD is extremely large compared to imaging sensors such as CCD and CMOS used for digital cameras, it is difficult to manufacture all the sensing elements with perfectly uniform properties. It is known that a degree of deterioration in each sensing element differs depending on the X-ray exposure record and the usage environment. Noise caused by defects of the sensing elements and time-varying deterioration of the sensing elements depending on the usage history of the FPD is referred to as offset noise. Since the offset noise is caused by deterioration of the FPD with time, once the offset noise occurs, it appears in every taken image from then on regardless of the time interval (lapse) between X-ray exposures. Therefore, to take an image using the FPD, an image (offset image) representing noise caused by defects and the time-varying deterioration of the sensing elements is obtained by calibration prior to the X-ray exposure (image-taking), and this image is subtracted from the taken image. Thus, the offset noise is removed from the taken image.

To take a highly reliable image with the FPD, it is preferable to calibrate the FPD just before the X-ray exposure and use the most accurate offset image possible. For example, an X-ray imaging system which automatically performs calibration based on time elapsed from the previous calibration and the number of X-ray exposures performed so as to acquire the most accurate offset image possible is known (see U.S. Pat. No. 6,476,394 corresponding to Japanese Patent Laid-Open Publication No. 2001-149355).

Signal charge of the previous image may be trapped by impurity level of the sensing elements and remain in the FPD after the X-ray exposure. Such residual signal charge in the FPD is superimposed onto the subsequent image as a residual image. The residual image attenuates after a long time. However, when the images are taken successively in short time intervals, the residual image is superimposed onto the subsequent image before it attenuates fully.

An X-ray imaging system using an imaging plate as an imaging device disclosed in U.S. Pat. No. 7,199,389 (corresponding to Japanese Patent Laid-Open Publication No. 2005-283798), for example, also causes residual images. In this X-ray imaging system, the residual image of the previous image is removed from the present image in consideration of attenuation based on time elapsed from the previous X-ray exposure.

An X-ray imaging apparatus of Japanese Patent Laid-Open Publication No. 2006-135748 contains a plurality of correction coefficients for residual image correction in accordance with various conditions, for example, environmental conditions such as the temperature of an X-ray imaging device and X-ray exposure conditions such as X-ray dose.

As described above, the attenuation of the residual images differs according to the time elapsed from the previous X-ray exposure (time lapse between the previous X-ray exposure and the present X-ray exposure), environmental conditions of the X-ray imaging device and X-ray exposure conditions as parameters. The Japanese Patent Laid-Open Publication No. 2006-135748 discloses to contain a plurality of correction coefficients corresponding to the above-described parameters. However, no specific description is provided. There are enormous numbers of correction coefficients corresponding to all possible combinations of the parameters, and it is just impractical to contain all the correction coefficients in the X-ray imaging device.

First, cost for hardware resources increase due to an enormous memory capacities to store all the correction coefficients. Second, to obtain data of the correction coefficients corresponding to all the combinations of the parameters, the correction coefficients need to be measured or calculated while conditions corresponding to the parameter values are changed. Such measurement or calculation requires massive cost and time.

Even a single parameter, for example, the temperature or the storage time of the X-ray imaging device contains an infinite number of values that change continuously, increasing the number of correction coefficients accordingly. Thus, it is impractical to contain all the correction coefficients for just one parameter as is the case with multiple parameters.

SUMMARY OF THE INVENTION

An object of the present invention is to provide an image processing apparatus and an image processing method for removing noise from an image with the least expenditure of cost and time.

In order to achieve the above objects and other objects, the image processing apparatus of the present invention includes an image acquiring section, a correction coefficient table, a parameter obtaining section, an interpolator, and a residual image remover. The image acquiring section acquires a first image and a second image, taken subsequent to the first image, from the imaging device. The correction coefficient table contains a plurality of first correction coefficients. Each of the first correction coefficients is used for determining an attenuation factor of a residual image of the first image superimposed on the second image. Each of the first correction coefficients corresponds to a value of a predetermined parameter. The parameter obtaining section obtains a value of the parameter at an exposure of the second image. The interpolator calculates a second correction coefficient corresponding to the obtained parameter value by interpolating the first correction coefficients in a case where the correction coefficient table does not contain a correction coefficient corresponding to the obtained parameter value. The residual image remover calculates the residual image based on a time lapse between an exposure of the first image and an exposure of the second image and the first correction coefficient or the second correction coefficient corresponding to the obtained parameter value to remove the residual image from the second image.

It is preferable that the predetermined parameter is composed of a first parameter and a second parameter different from each other. It is preferable that the interpolator interpolates the second correction coefficient based on the first and the second parameters.

It is preferable that the interpolator fixes a value of the first parameter and changes values of the second parameter to obtain a data string of the first correction coefficients corresponding to the changed values of the second parameter, and performs one-dimensional interpolation to calculate the second correction coefficient corresponding to a value of the second parameter at the exposure of the second image based on the data string.

It is preferable that the interpolator performs two-dimensional interpolation using the first correction coefficients corresponding to parameter values close to the obtained parameter values.

It is preferable that the interpolator additionally writes the calculated second correction coefficient to the correction coefficient table.

It is preferable that one of the first parameter and the second parameter is information of an environmental condition or an exposure condition.

It is preferable that the environmental condition includes a temperature of the imaging device.

It is preferable that the exposure condition includes a storage time of the imaging device.

It is preferable that the interpolator compares a temperature difference of the imaging device between the exposure of the first image and the exposure of the second image with a predetermined threshold value in a case where the correction coefficient table does not contain a correction coefficient corresponding to a temperature of the imaging device at the exposure of the second image. In a case where the temperature difference is larger than the threshold value, it is preferable that the interpolator calculates the second correction coefficient corresponding to the temperature of the imaging device at the exposure of the second image. In a case where the temperature difference is equal to or smaller than the threshold value, it is preferable that the interpolator uses a correction coefficient corresponding to the temperature of the imaging device at the exposure of the first image.

It is preferable that the imaging device is a direct-conversion flat panel detector having a photoconductive layer that directly converts radiation into electrical charge.

An image processing method of the present invention includes an image acquiring step, a parameter obtaining step, a referring step, a coefficient calculating step and a removing step. In the image acquiring step, a first image and a second image, taken subsequent to the first image, are acquired from the imaging device. In the parameter obtaining step, a parameter value of an exposure of the second image is obtained. In the referring step, a correction coefficient table is referred to and checked if the correction coefficient table contains a correction coefficient corresponding to the obtained parameter value. In the correction coefficient table, a plurality of first correction coefficients, each of which is used for determining an attenuation factor of a residual image of the first image superimposed on the second image, are previously stored. In the coefficient calculating step, a second correction coefficient corresponding to the obtained parameter value is calculated by interpolation of the first correction coefficients in a case where the correction coefficient table does not contain a correction coefficient corresponding to the obtained parameter value. In the removing step, the residual image is calculated based on a time lapse between an exposure of the first image and the exposure of the second image and the first correction coefficient or the second coefficient corresponding to the obtained parameter. Then, the calculated residual image is removed from the second image.

According to the present invention, the residual image is removed from the image without time and cost by the image correction.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
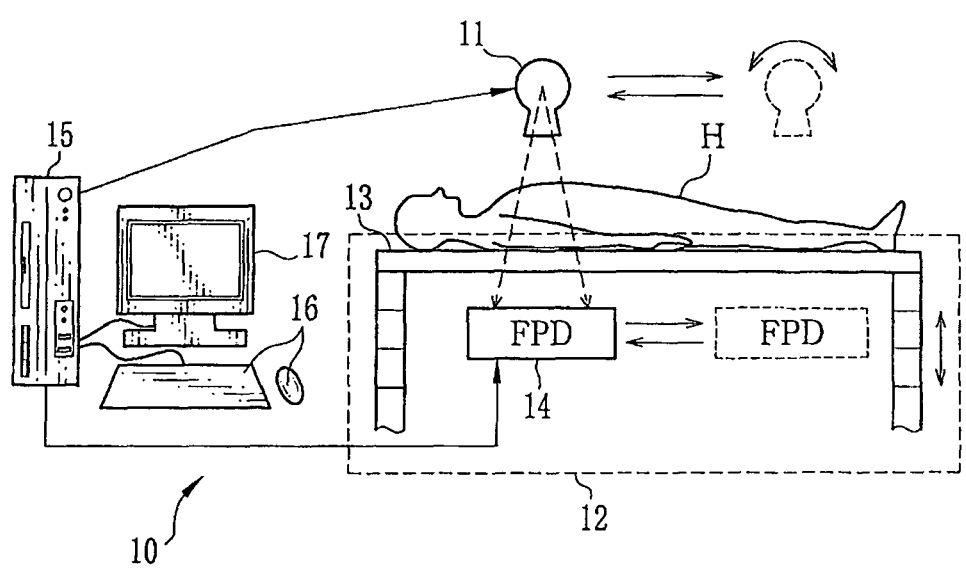
FIG. 1 is an explanatory view schematically showing an X-ray imaging system.

As shown in FIG. 1, an X-ray imaging system or radiographic imaging system 10 is a system for taking digital radiographic images of a patient (subject) H by irradiating the patient with X-rays. The X-ray imaging system 10 is composed of an X-ray source 11, an X-ray imaging apparatus 12, an image processing apparatus 15 and the like. The X-ray imaging apparatus 12 is composed of an X-ray table 13, a FPD 14 and the like.

The X-ray source 11 is an X-ray tube that produces X-ray by accelerating and impacting electrons on a target, such as tungsten or molybdenum, from a cathode filament (not shown). Adjusting the X-ray tube current and the X-ray tube voltage supplied to the cathode changes the dose and the radiation quality of X-rays irradiated from the X-ray source 11. The dose and the radiation quality of X-rays are changed as necessary depending on the thickness of the patient H and a body site thereof.

The X-ray source 11 is mounted on a ceiling (not shown) of an X-ray room using a support arm (not shown). The support arm movably and rotatably supports the X-ray source 11 above the X-ray table 13. The X-ray source 11 can be moved in vertical and horizontal directions, and change its orientation of X-ray irradiation within a predetermined angle. Thereby, the X-ray source 11 is capable of irradiating a desired position of the patient H, lying on the X-ray table 13, with X-ray. The X-ray source 11 is also manually movable. When the X-ray table 13 is lifted or lowered, the X-ray source 11 is also moved up or down so as to keep the distance between the X-ray source 11 and the FPD 14 constant.

The X-ray table 13 has extendable legs to adjust its height from a floor of the X-ray room. The X-ray table 13 is fixed to the floor via the extendable legs. The extendable legs, however, are movable. A portion of the X-ray table 13 on which the patient H lies is made of a material that passes substantially all X-rays from the X-ray source 11. Therefore, an image of the X-ray table 13 is not superimposed on the taken X-ray image.

The FPD 14 is a direct conversion flat panel detector that directly converts incident X-ray into electrical charge without conversion into visible light. The FPD 14 is placed on a back surface of the X-ray table 13 with an imaging surface facing up toward the X-ray source 11. The FPD 14 is movable in a longitudinal direction of the X-ray table 13, namely, in the side-to-side direction in FIG. 1. When a position and/or orientation of the X-ray source 11 is changed, the FPD 14 is also moved to a position where X-ray from the X-ray source 11 is efficiently received.

The FPD 14 covers the entire chest of the patient H. The FPD 14 is composed of a glass substrate on which TFTs are formed, pixel electrodes each corresponding to a pixel, a photoconductive layer and a bias electrode layered in this order from the bottom (all not shown).

The photoconductive layer is made of amorphous selenium or the like, and generates electrical charge in accordance with dose and radiation quality of X-rays incident thereon. A bias voltage is applied between the bias electrode and the pixel electrode. This bias voltage generates an electric field in the photoconductive layer, and electrical charge generated in the photoconductive layer is collected by the pixel electrode. The pixel electrode is positioned above a capacitor (not shown) that stores the collected electrical charge. The pixel electrode is connected to a TFT. The electrical charge stored in the capacitor is read via the TFT. The FPD 14 converts the electrical charge read by the TFT into digital image signals using an A/D converter (not shown) and outputs the image signals to the image processing apparatus 15.

The image processing apparatus 15 controls the whole operations of the X-ray imaging system 10. For example, to control dose and radiation quality of X-rays to be irradiated from the X-ray source 11, the image processing apparatus 15 adjusts the tube current and the tube voltage of the X-ray source 11 in response to an input from the operating section 16 composed of a keyboard, a mouse and the like. The image processing apparatus 15 performs various image processing to image signals output from the FPD 14 and generates an image, and displays it on a monitor 17.

Figure 2:
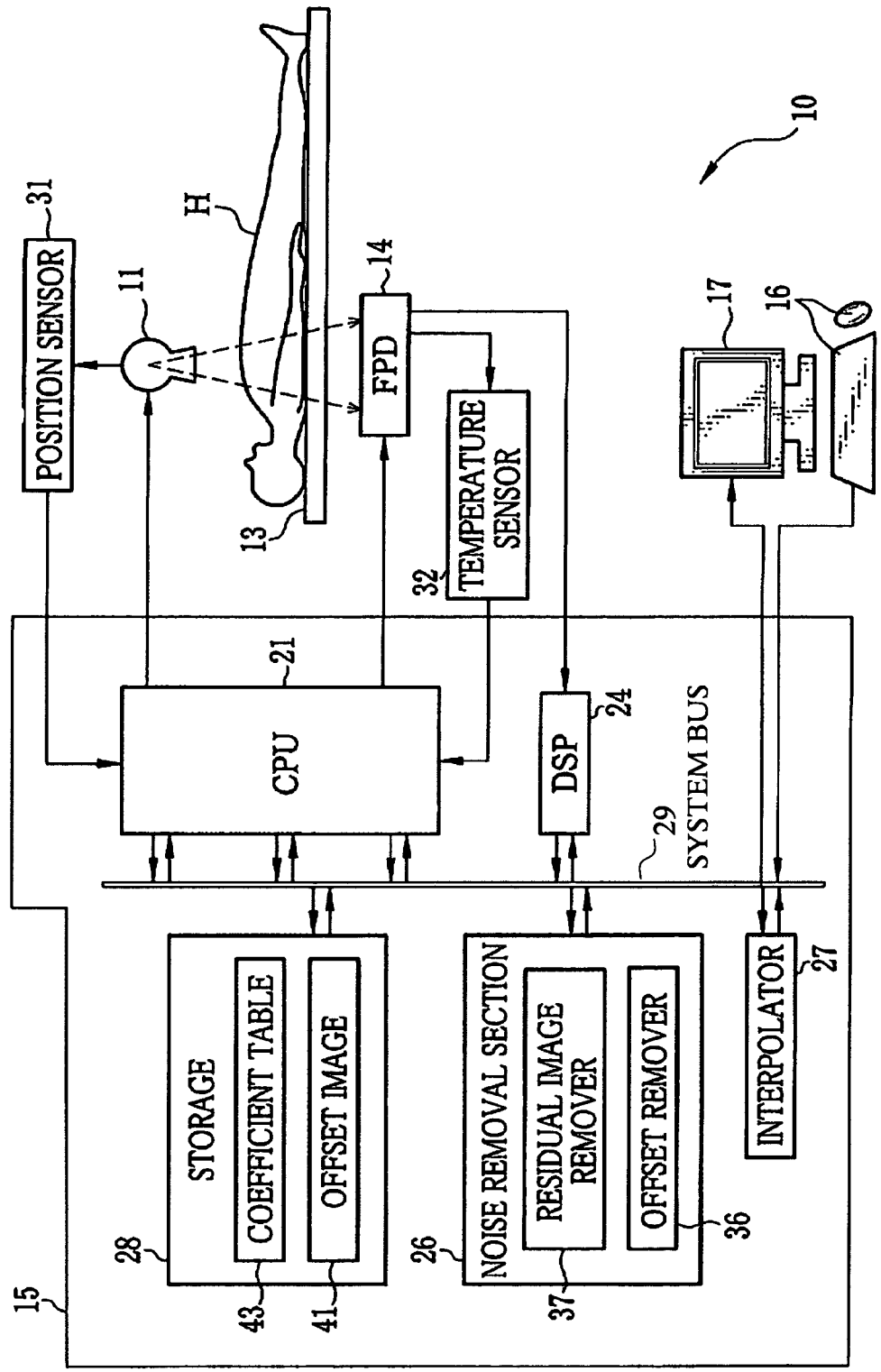
FIG. 2 is a block diagram showing an electrical configuration of the X-ray imaging system.

As shown in FIG. 2, the image processing apparatus 15 is composed of a CPU 21, a DSP 24, a noise removal section 26 or image correction device, an interpolator 27, storage 28 and the like.

The CPU 21 controls every section of the image processing apparatus 15 by communicating control signals and data with the sections via a system bus 29. For example, the CPU 21 receives operation signals from the operating section 16 to control the position of the X-ray source 11, the dose and the radiation quality of X-rays, the position of the FPD 14 and the like. The CPU 21 controls the tube current and the tube voltage of the X-ray source 11 to adjust the dose and the radiation quality of X-rays. The CPU 21 receives information signals, indicating the position and the orientation of the X-ray source 11, from a position sensor 31 connected to the X-ray source 11, and controls the position of the FPD 14 based on the information signals.

The CPU 21 and a communication I/F (not shown) constitute an image acquiring section. The CPU 21 controls various operations of the FPD 14 and acquires images from the FPD 14 by communicating with the FPD 14 via the communication I/F. For example, the CPU 21 causes a timing generator (not shown) to generate predetermined drive signals and inputs them to the FPD 14 to control storage of signal charge in the FPD 14 and reading of image signals. The CPU 21 is connected to a temperature sensor 32 that measures the temperature (hereinafter referred to as FPD temperature) of an imaging surface of the FPD 14. The CPU 21 receives information of the FPD temperature from the temperature sensor 32 and inputs it to the noise removal section 26 and the interpolator 27 to drive the noise removal section 26 and the interpolator 27 in accordance with the FPD temperature. The FPD temperature varies depending on, for example, environmental conditions of the X-ray room such as its room temperature.

The image signals from the FPD 14 are input to the DSP 24. The DSP 24 performs various image processing such as tone adjustment and gamma correction to the input image signals to generate an image to be displayed on the monitor 17. The image that has been subjected to various image processing in the DSP 24 (hereinafter simply referred to as image or taken image) is stored in the storage 28 composed of memory, HDD and the like.

The noise removal section 26 is composed of an offset remover 36 and a residual image remover 37, and removes a noise component from the taken image. The noise component superimposed on the taken image is broadly divided into offset noise and a residual image or image lag. The offset remover 36 removes the offset noise superimposed on the taken image. The residual image remover 37 removes the residual image superimposed on the taken image.

The offset noise is due to defects of the sensing elements of the FPD 14, the usage history of the FPD 14 and the like. Once the offset noise occurs, it appears in every taken image from then on regardless of the time interval between the exposures. A residual image is generated by superimposing a component of a previous image (hereinafter referred to as first image) on a subsequent image (hereinafter referred to as second image or present image) when images are taken in succession in a relatively short time. Since the residual image attenuates with time, if the time interval between successive exposures is long enough, there is substantially no residual image of the first image superimposed on the second image.

The offset remover 36 removes the offset noise superimposed on the taken image by subtracting an offset image 41 from the taken image. The offset image 41 represents noise caused by the defects of the sensing elements and deterioration of the FPD 14 with time. The offset image 41 is generated from dark images (not shown). During a sequence for the calibration of the X-ray imaging system 10, the dark images are acquired in succession at predetermined time intervals without X-ray irradiation. For the calibration, the offset image 41 is generated by averaging 16 dark images, for example.

When the images are taken successively in a relatively short time using the FPD 14, the residual image remover 37 calculates an attenuation factor of the first image at the time of taking the second image based on an attenuation curve. This attenuation curve shows time-varying attenuation of a residual image of the first image which is superimposed on the second image. The residual image remover 37 multiplies each pixel value of the first image by the calculated attenuation factor, and subtracts this product from the corresponding pixel value of the second image. Thus, the residual image of the first image is removed from the second image.

The residual image decreases exponentially with time. "y1" represents a pixel value of a pixel in the first image at the exposure of the first image (hereinafter referred to as first exposure). "y1'" represents a pixel value of the same pixel in the first image attenuated with time after the first exposure. "Δt" represents a time interval or time lapse between the first exposure and the exposure of the second image (hereinafter referred to as second exposure). The values y1', y1 and Δt satisfy a mathematical expression y1'=exp(−CΔt)×y1. An attenuation curve describing the attenuation of the residual image with time is represented by y1'/y1=exp(−CΔt) irrespective of the pixel value y1. "C" represents a correction coefficient (hereinafter referred to as coefficient) that changes the attenuation curve and varies with parameters of the second exposure such as storage time (exposure time) of the FPD 14 and the FPD temperature. "exp(CΔt)" represents an attenuation factor by which the pixel value y1 of the first image is multiplied to obtain the pixel value y1' of the first image in removing the residual image. The term "attenuation factor" is used herein for "exp(−CΔt)" as a residual noise level or attenuation characteristic.

The residual image remover 37 selects an appropriate coefficient C for correction from a coefficient table 43 based on information received from the CPU 21, such as the storage time and the FPD temperature at the second exposure. Next, the residual image remover 37 calculates the attenuation factor to be multiplied to the pixel value of the first image based on the selected coefficient and the time interval Δt between the first and second exposures. The residual image remover 37 multiplies the pixel value of the first image by the calculated attenuation factor, and subtracts the product from the pixel value of the second image. Thus, the residual image superimposed on the second image is removed.

A plurality of coefficients corresponding to a plurality of combinations of the storage time and FPD temperature at the second exposure are previously stored in the coefficient table 43. The coefficients stored in the coefficient table 43 are determined at the time of the calibration of the X-ray imaging system 10. Images are taken successively after irradiating the FPD 14 with X-ray of predetermined radiation quality and dose without placing the patient H, and then a coefficient is calculated based on attenuation of pixel values of the taken images with time. This arithmetic processing is performed by the interpolator 27, for example, as will be described later.

In a case where an appropriate coefficient is not stored in the coefficient table 43, the residual image remover 37 causes the interpolator 27 to calculate a coefficient corresponding to the storage time and the FPD temperature of the second exposure. The attenuation curve of the residual image of the first image is corrected or calculated using the coefficient, and the residual image of the first image superimposed on the second image is removed based on the corrected attenuation curve.

In response to an instruction from the residual image remover 37, the interpolator 27 calculates a coefficient corresponding to parameters (the storage time and the FPD temperature of the second exposure) which are not stored in the coefficient table 43. To be more specific, in a case where the coefficient corresponding to the storage time of the second exposure is not stored in the coefficient table 43, the interpolator 27 reads multiple coefficients corresponding to the FPD temperature of the second exposure from the coefficient table 43, and calculates a coefficient corresponding to the storage time of the second exposure by interpolation. Thereby, the attenuation curve of the residual image of the first image is corrected to correspond to the parameters of the second exposure. With the use of the corrected attenuation curve, the residual image remover 37 appropriately removes the residual image from the second image in accordance with the parameters of the second exposure.

In a case where a coefficient corresponding to the FPD temperature of the second exposure is not stored in the coefficient table 43, the interpolator 27 reads multiple coefficients corresponding to the storage time of the second exposure from the coefficient table 43, and calculates a coefficient corresponding to the FPD temperature by interpolation.

In a case where the coefficient table 43 does not contain an appropriate coefficient corresponding to any one of the storage time and the FPD temperature of the second exposure, the interpolator 27 calculates a coefficient corresponding to the storage time of the second exposure by interpolation of multiple coefficients corresponding to various FPD temperatures. Then, a coefficient corresponding to the FPD temperature of the second exposure is calculated by interpolation of the calculated coefficients corresponding to the various FPD temperatures.

The storage 28 is a memory for storing data to be used in various sections of the image processing apparatus 15. In the storage 28 are stored images taken with the FPD 14, data of the patient H, the offset image 41 and the coefficient table 43, for example. The CPU 21, the noise removal section 26 and the interpolator 27 read data from the storage 28 to a working memory (not shown) and execute various processing.

Figure 3:
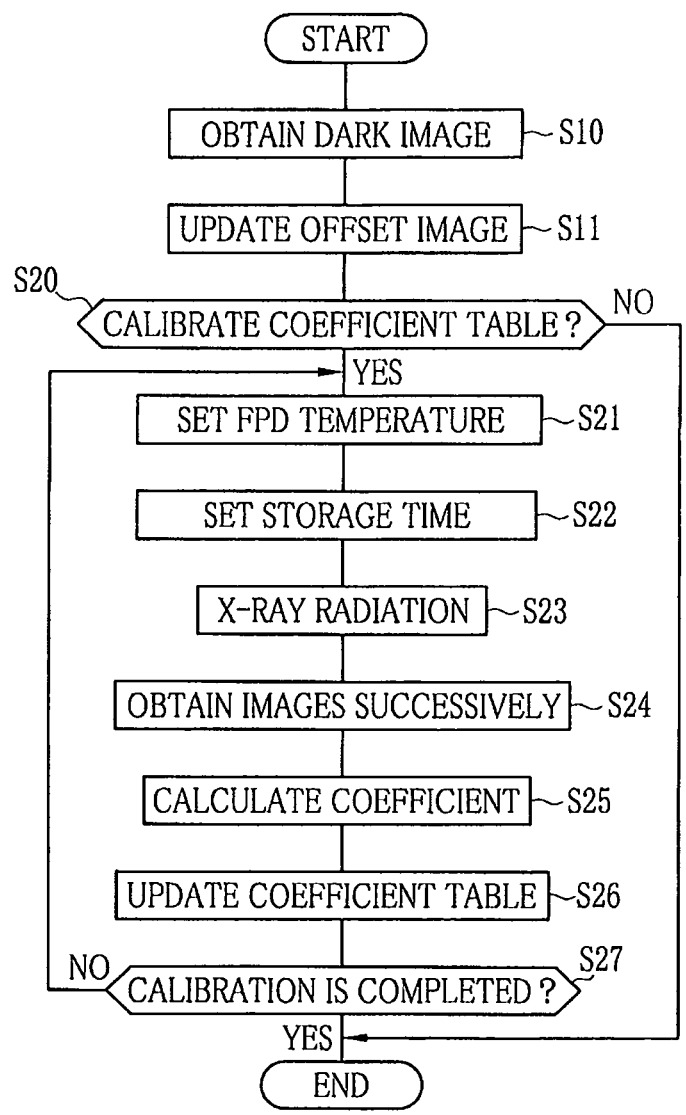
FIG. 3 is a flowchart showing steps for calibration of the X-ray imaging system.

Hereinafter, steps for taking a digital radiographic image of the patient H with the above configured X-ray imaging system 10 are described. As shown in FIG. 3, calibration of the X-ray imaging system 10 is performed when the X-ray imaging system 10 starts up, or at regular maintenance.

In the calibration of the X-ray imaging system 10, dark images are acquired without X-ray irradiation to the FPD 14 when the X-ray imaging system 10 starts up (S10). The offset remover 36 generates the offset image 41 from the dark images and stores it in the storage 28 (S11). Thus, the offset image 41 is automatically updated every time the X-ray imaging system 10 starts up.

At the regular maintenance, the coefficient table 43 is updated as necessary in addition to the update of the offset image 41 (S20 to S27).

When calibration of the coefficient table 43 is instructed (S20) via a menu screen or the like displayed on the monitor 17 after the offset image 41 is updated, an FPD controller (not shown) adjusts the FPD temperature at a predetermined value using a cooling fan or an air conditioner (or a heater when necessary) (S21). When the FPD temperature reaches the predetermined value, storage time of the FPD 14 is set (S22). X-ray of predetermined dose and radiation quality is irradiated without placing the patient H on the X-ray table 13. (S23). The FPD controller 23 acquires multiple images successively from the FPD 14 and temporarily stores them in the storage 28 (S24).

The interpolator 27 calculates a coefficient corresponding to the set storage time and FPD temperature from the acquired images (S25), and stores the calculated coefficient in the coefficient table 43. Thereby, the coefficient stored in the coefficient table 43 is updated (S26).

The update of the coefficient (S21 to S26) is performed for two or more times with changed FPD temperatures and storage times. Thus, the coefficients corresponding to various combinations of the FPD temperature and the storage time are calculated and updated.

Figure 4:
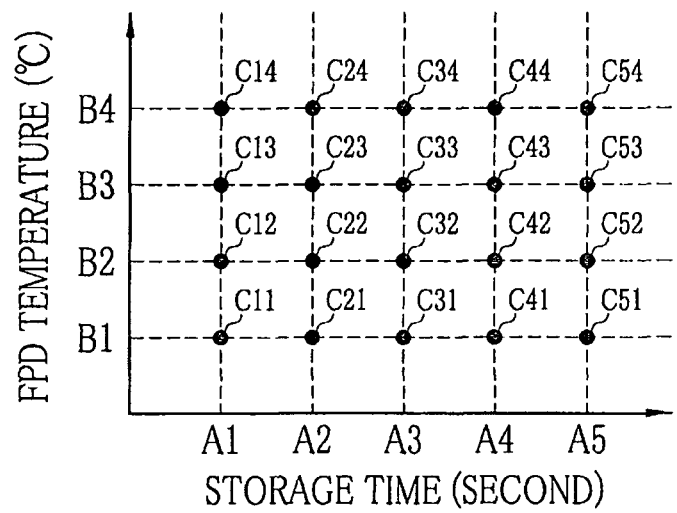
FIG. 4 is an explanatory view of a coefficient table.
Figure 5:
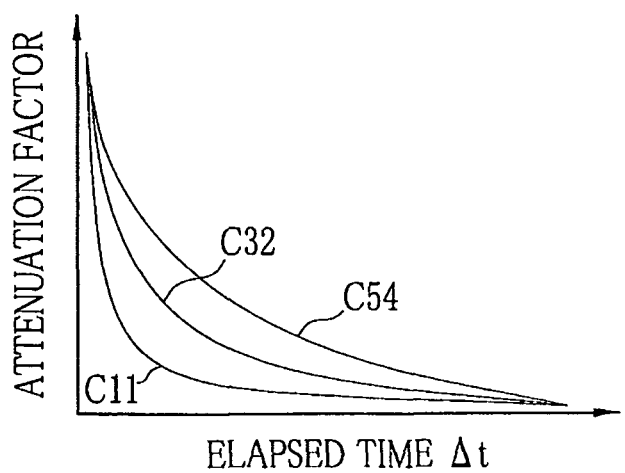
FIG. 5 is a graph showing examples of relations between coefficients and attenuation curves.

As shown in FIG. 4, coefficients for 20 combinations of storage time (five values from A1 to A5) and FPD temperature (four values from B1 to B4) are previously determined by the above-described calibration. "$C_{ij}$" represents a coefficient corresponding to a combination of storage time "Ai" ("i" is a natural number from one to five) and FPD temperature "Bj" ("j" is a natural number from one to four). A signal component of the residual image superimposed on the second image becomes cumulatively larger as the storage time Ai becomes longer even if the FPD temperature Bj remains the same. On the other hand, the residual image remains longer as the FPD temperature Bj at the second exposure rises even if the storage time Ai remains the same. Thus, the attenuation curves in FIG. 5 differ from each other in their curvatures depending on the coefficient Cij.

Figure 6:
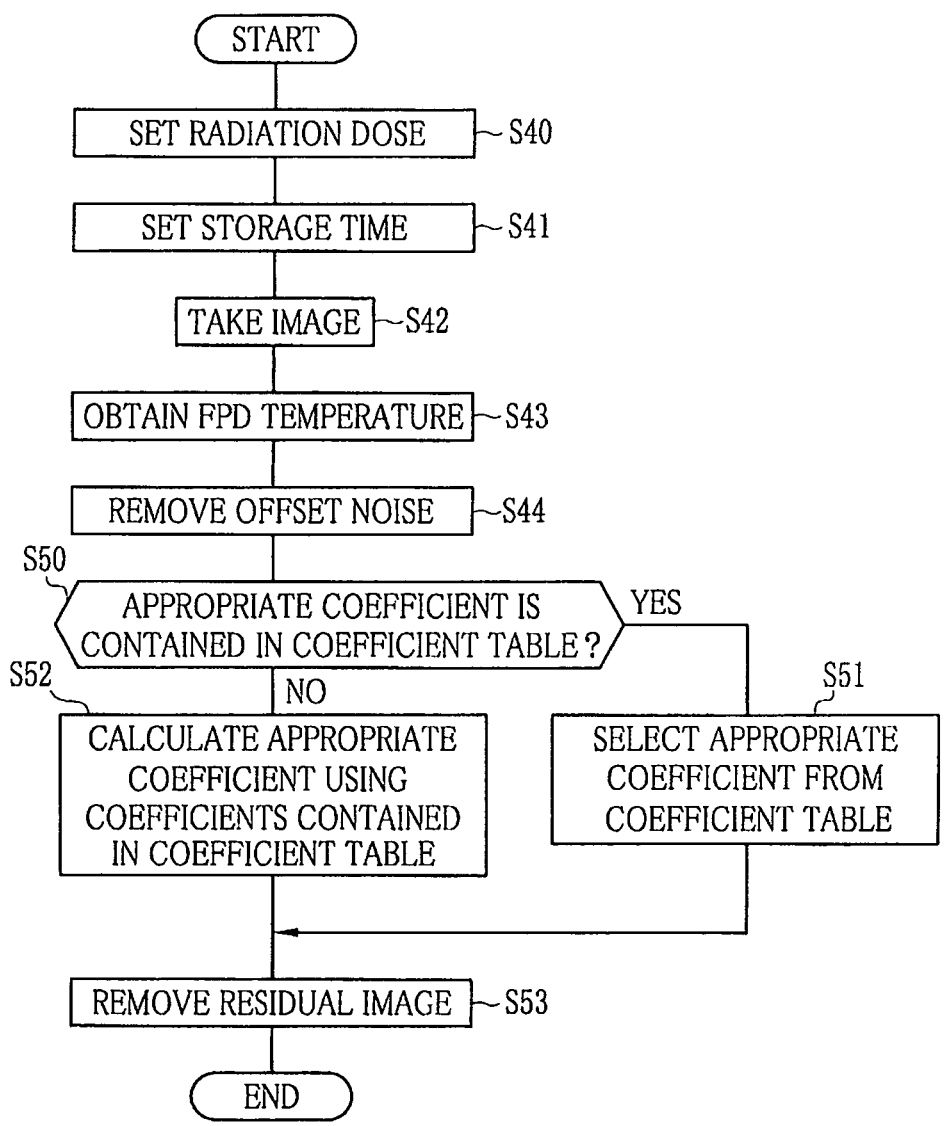
FIG. 6 is a flowchart showing steps for removing noise from a taken image.

An image of the patient H is taken after the offset image 41 and the coefficient are obtained and updated by the calibration. To take an image of the patient H, as shown in FIG. 6, first, radiation quality and dose of X-rays are set in accordance with the size and the shape of the region of interest of the patient H (S40). Then, the storage time of the FPD 14 is set in accordance with the physical features of the patient H and the set dose and radiation quality (S41). After the settings are input, X-ray is irradiated from the X-ray source 11 and an image of the patient H is taken (S42). At this time, the CPU 21 obtains the temperature of the FPD 14 at the exposure from the temperature sensor 32 (S43).

Thereafter, the noise removal section 26 removes the offset noise and the residual image from the image acquired from the FPD 14 (S44, S50 to S53). First, the offset remover 36 subtracts the offset image 41 from the image to remove the superimposed offset noise from the image (S44). In a case where the image is the one taken immediately after the calibration of the FPD 14, the following steps (S50 to S53) for removing the residual image are omitted.

In a case where the image is the second or subsequent image taken after the X-ray imaging system 10 starts up, the residual image remover 37 removes the residual image of the first image from the taken image (second image) (S50 to S53). At this time, the residual image remover 37 checks whether a coefficient corresponding to the storage time and the FPD temperature (hereinafter referred to as parameters) of the second exposure is contained in the coefficient table 43 (S50).

In a case where a coefficient corresponding to the parameters of the second exposure is stored in the coefficient table 43, the residual image remover 37 selects the appropriate coefficient and calculates an attenuation factor using the selected coefficient (S51). The residual image is removed by multiplying the first image by the attenuation factor (residual noise level), and subtracting the product of the first image and the attenuation factor from the second image (S53).

On the other hand, in a case where a coefficient corresponding to the parameters of the second exposure is not stored in the coefficient table 43, the residual image remover 37 causes the interpolator 27 to calculate a coefficient corresponding to the parameters of the second exposure (S52). The residual image remover 37 calculates an attenuation factor using a coefficient calculated by the interpolator 27. The first image is multiplied by this attenuation factor, and the product of the first image and the attenuation factor is subtracted from the second image. Thus, the residual image is removed (S53).

The calculation of the coefficient by the interpolator 27 (S52) differs depending on the parameters of the second exposure. For example, in a case where coefficients contained in the coefficient table 43 are appropriate only for the storage time of the FPD 14, but not for the FPD temperature of the second exposure, a coefficient corresponding to the FPD temperature is calculated by interpolation using the coefficients, of various FPD temperatures, coinciding the storage time of the second temperature. On the other hand, in a case where coefficients contained in the coefficient table 43 are appropriate only for the FPD temperature, but not for the storage time of the second exposure, a coefficient corresponding to the storage time is calculated by interpolation using coefficients, of various storage times, coinciding the FPD temperature of the second exposure.

Figure 7:
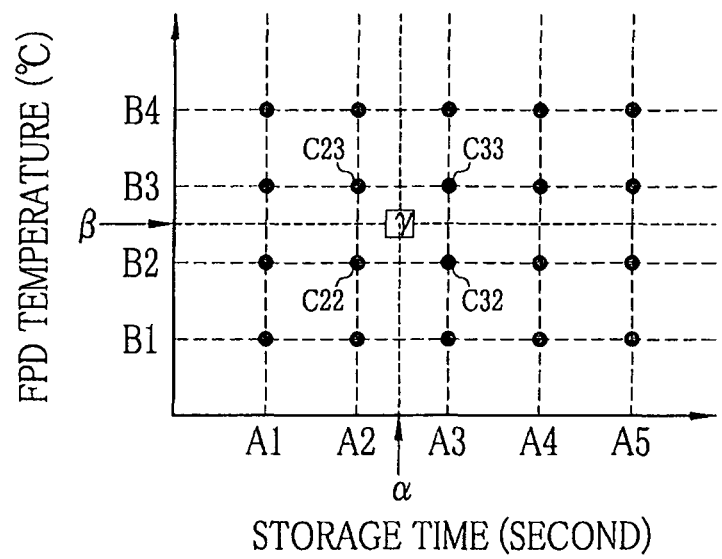
FIG. 7 is an explanatory view showing an example of relations between parameters and coefficients contained in the coefficients table in the first embodiment.
Figure 8:
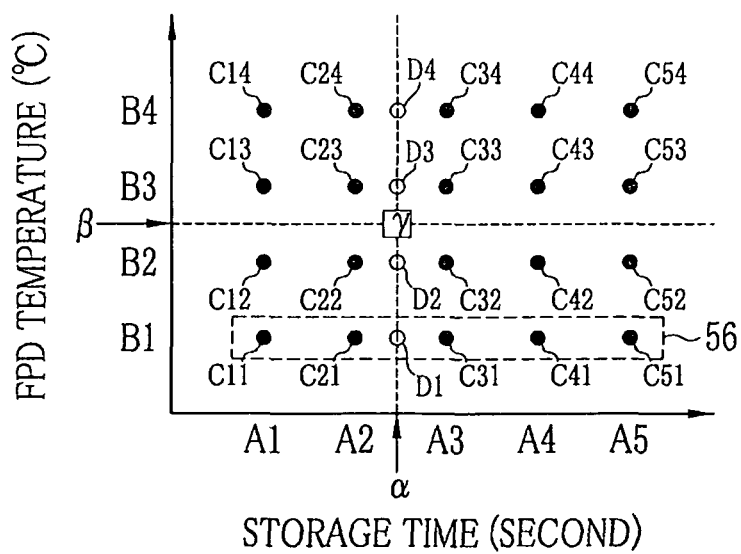
FIG. 8 is an explanatory view showing how to calculate a coefficient corresponding to a storage time a by interpolation based on a coefficient in the coefficient table while the FPD temperature is fixed.
Figure 9:
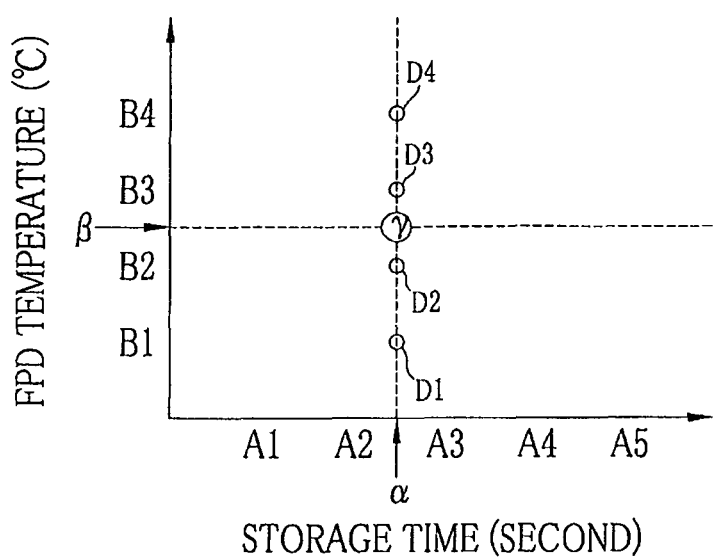
FIG. 9 is an explanatory view showing how to calculate a coefficient corresponding to storage time using calculated coefficients for the FPD temperatures.

If any of the coefficients contained in the coefficient table 43 does not correspond to the parameter of the second exposure, the interpolator 27 calculates an appropriate coefficient by applying one-dimensional interpolation twice as shown in FIGS. 7 to 9.

For example, in FIG. 7, storage time α of the second exposure is between the storage times A2 and A3, and an FPD temperature β of the second exposure is between the FPD temperatures B2 and B3. Appropriate coefficients are calculated for the storage times A2 and A3 and the FPD temperatures B2 and B3 at the time of calibration. A coefficient represented by a point γ corresponding to the parameters (storage time α, FPD temperature β) of the second exposure is not contained in the coefficient table 43. The coefficient represented by the point γ takes a value different from the coefficients C22, C32, C23 and C33 of the parameters in the vicinity of the point γ.

As shown in FIG. 8, the interpolator 27 calculates a coefficient D1 corresponding to the parameters, the FPD temperature B1 and the storage time α, by interpolation using a data string 56 of coefficients Ci1 (i is a natural number from 1 to 5). In the same manner, the coefficient D2 corresponding to the FPD temperature B2 and the storage time α, the coefficient D3 corresponding to the FPD temperature B3 and the storage time α, and the coefficient D4 corresponding to the FPD temperature B4 and the storage time α are interpolated using the data strings Ci2, Ci3 and Ci4. As shown in FIG. 9, the interpolator 27 calculates the coefficient γ corresponding to the parameters, the storage time α and the FPD temperature β, of the second exposure by the interpolation. In FIG. 9, the coefficient γ is represented by coordinates (α, β).

Figure 10:
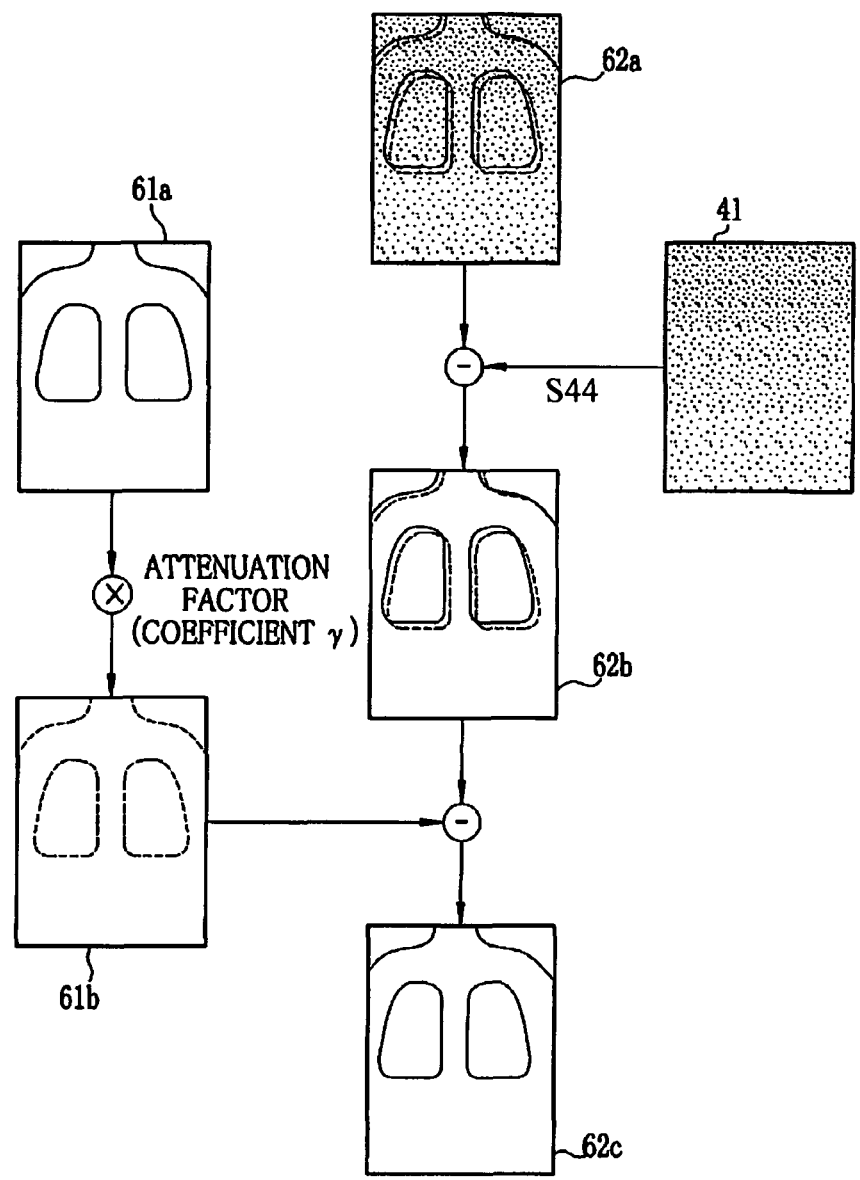
FIG. 10 is an explanatory view showing how to remove noise from the taken image.

The noise removal section 26 removes the offset noise and the residual image as illustrated in FIG. 10. In addition to a taken image (shown in solid lines) of the patient H, a residual image (shown in broken lines) of a first image 61a taken prior to a second image 62a is superimposed on the second image 62a before the removal of noise. The offset noise is also superimposed on the second image 62a. Accordingly, the offset remover 36 subtracts the offset image 41, that is, an image of the offset noise, from the second image 62a and generates a second image 62b from which the offset noise is removed (S44 in FIG. 6).

The residual image remover 37 multiplies the first image 61a, from which the residual image and the offset noise are removed in the first exposure, by an attenuation factor, calculated using a coefficient γ corresponding to the parameters of the exposure of the second image 62a. Thus, a residual image 61b of the first image 61a superimposed on the second image 62b is generated.

The residual image remover 37 subtracts the residual image 61b from the second image 62b from which the offset noise has been removed, and thus a noise-free second image 62c is generated. The noise-free second image 62c is displayed on the monitor 17 and used for diagnosis.

As described above, the X-ray imaging system 10 calculates the appropriate coefficient by interpolation in a case where the appropriate coefficient is not contained in the coefficient table 43, and removes the residual image with the use of the calculated coefficient. The X-ray imaging system 10 accurately removes a residual image using the number of coefficients enough for the interpolation. Thus, it is unnecessary to store an enormous amount of coefficients to cover all possible parameters of the exposure in the coefficient table 43. This X-ray imaging system 10 does not require frequent calibration. The residual image is removed without interrupting the radiographic imaging and inconvenience of radiographic technologists.

In the first embodiment, in a case where the coefficient corresponding to the parameters (both the storage time α and the FPD temperature β) is not contained in the coefficient table 43, the coefficients D1 to D4 corresponding to the storage time α are calculated by interpolation of the coefficients for the FPD temperatures B1 to B4. A coefficient γ corresponding to both the storage time α and the FPD temperature β is calculated by interpolation of the coefficients D1 to D4. The calculation of the coefficient may be carried out in an inverse order.

Figure 11:
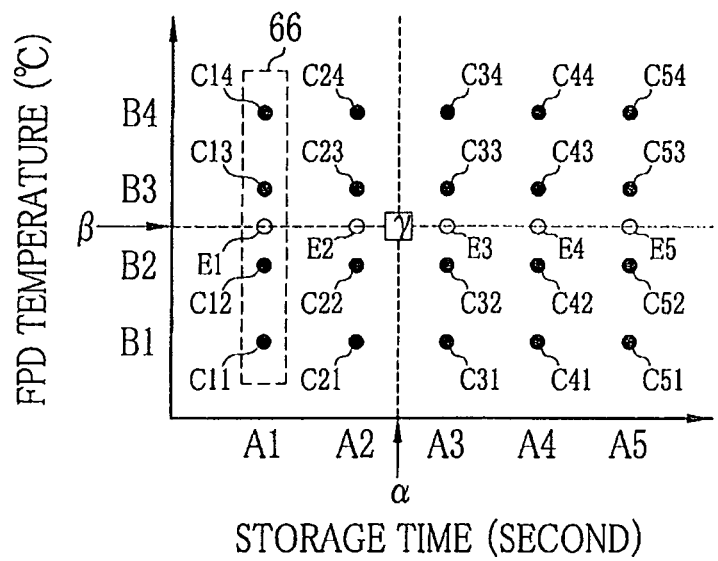
FIG. 11 is an explanatory view showing how to calculate a coefficient corresponding to FPD temperature β based on a coefficient in the coefficient table while the storage time is fixed.
Figure 12:
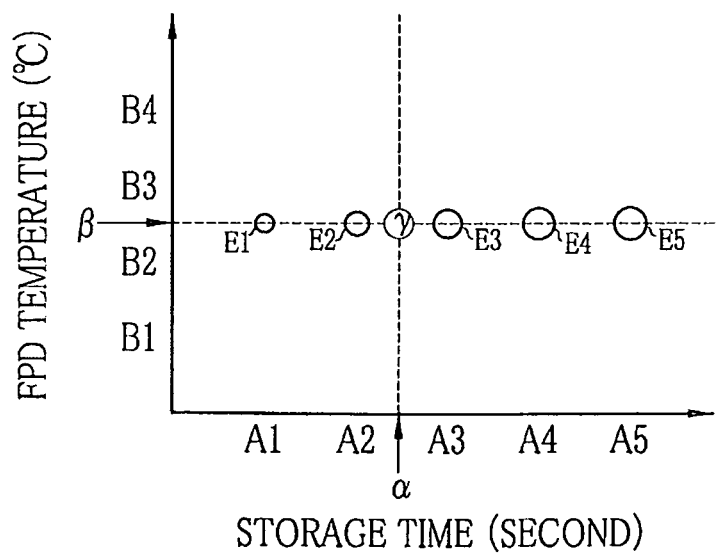
FIG. 12 is an explanatory view showing how to calculate a coefficient corresponding to the parameter of the second exposure using the calculated coefficients of the storage times.

For example, in FIG. 11, first, a coefficient E1 corresponding to the parameters, storage time A1 and the FPD temperature β, is calculated by interpolation of a data string 66 of coefficients C1$j$ ("j" is a natural number from 1 to 4) corresponding to the storage time A1. In the same manner, the coefficient E2 corresponding to the storage time A2 and the FPD temperature β, the coefficient E3 corresponding to the storage time A3 and the FPD temperature β, the coefficient E4 corresponding to the storage time A4 and the FPD temperature β, and the coefficient E5 corresponding to the storage time A5 and the FPD temperature β are interpolated using the data strings corresponding to the storage time A2, A3, A4 and A5, respectively. Thereafter, as shown in FIG. 12, the coefficient γ corresponding to the parameters, the storage time α and the FPD temperature β, of the second exposure is calculated by the interpolation using the calculated coefficients E1 to E5 corresponding to the FPD temperature β.

Figure 13:
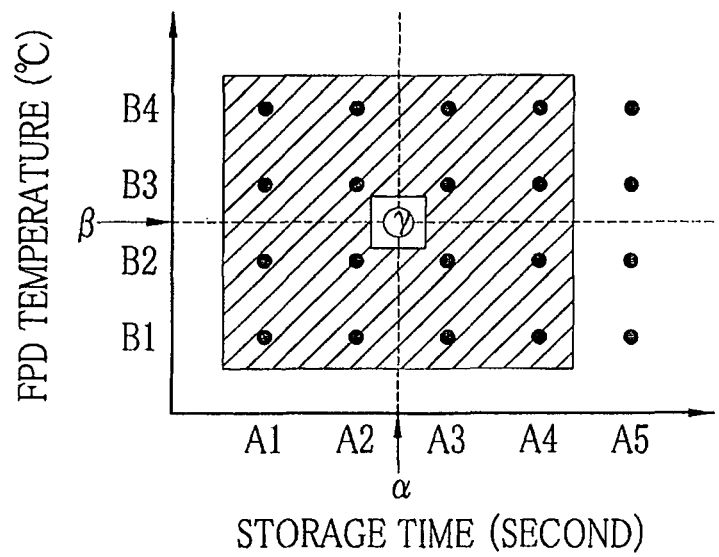
FIG. 13 is an explanatory view showing how to calculate a coefficient, corresponding to a parameter of the second exposure, by 2-dimensional interpolation.
Figure 14:
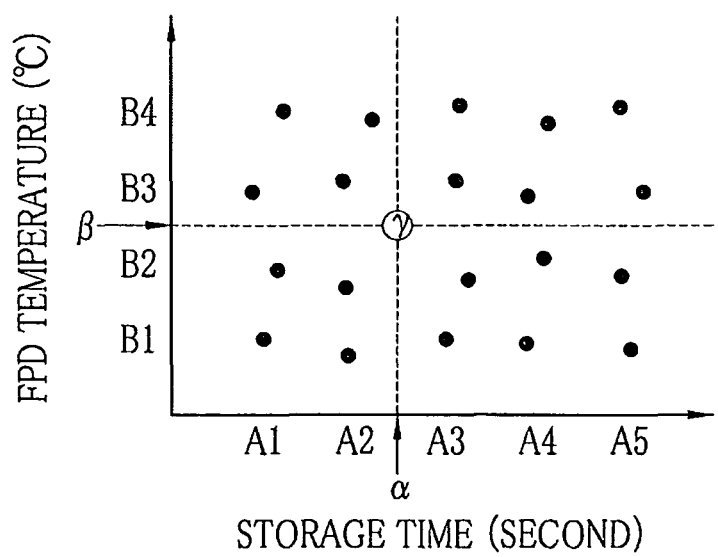
FIG. 14 is an explanatory view showing an example of coefficients, contained in the coefficient table, applicable in calculation thereof by 2-dimensional interpolation.

In a case a coefficient corresponding to both the parameters (the storage time α and the FPD temperature β) of the second exposure is not contained in the coefficient table 43, as shown in FIG. 13, a coefficient γ may be calculated, for example, in just one computation using two-dimensional interpolation of coefficients (shown in a hatched region in FIG. 13) around the target coefficient γ, instead of applying one-dimensional interpolation twice. Multiple regression analysis using a polynomial may be used as the 2-dimensional interpolation. A coefficient corresponding to the parameters of the exposure may be calculated by least squares approximation of quadratic function of two variables, $A(x,y)=a\cdot x^2+b\cdot y^2+c\cdot xy+d\cdot x+e\cdot y+f$, for example. In a case where two-dimensional interpolation is used for calculating a coefficient, it is not necessary for the coefficient table 43 to previously contain coefficients corresponding to the predetermined values such as the storage times A1 to A5 and the FPD temperatures B1 to B4. As shown in FIG. 14, the coefficient table 43 may contain random coefficients corresponding to various parameter values.

It is preferable that the X-ray imaging system 10 of the first embodiment is capable of adding the interpolated coefficients, calculated by the interpolator 27, to the coefficient table 43. Thereby, the number of coefficients to be interpolated in subsequent exposures is reduced. In addition, with the increase of the number of coefficients in the coefficient table 43, interpolation of a coefficient is performed more accurately. It is preferable to add intermediately calculated coefficients (for example, D1 to D4 in FIG. 8 and E1 to E5 in FIG. 11), used for interpolating the coefficient to be used by the residual image remover 37, to the coefficient table 43.

Second Embodiment

The X-ray imaging system 10 takes images of various patients (subjects) H in corresponding imaging conditions. It is rare that the parameters of the exposure coincide with parameters (storage time and FPD temperature) previously stored in the coefficient table 43. In many cases, the interpolator 27 calculates the coefficient by interpolation. A relatively high machine power is required for the image processing apparatus 15 in a case where a coefficient is calculated for every exposure. In this embodiment, an example of the X-ray imaging system 10 that requires less machine power is described. A component similar to that in FIG. 2 is designated by the same numeral shown in FIG. 2, and a description thereof is omitted.

Figure 15:
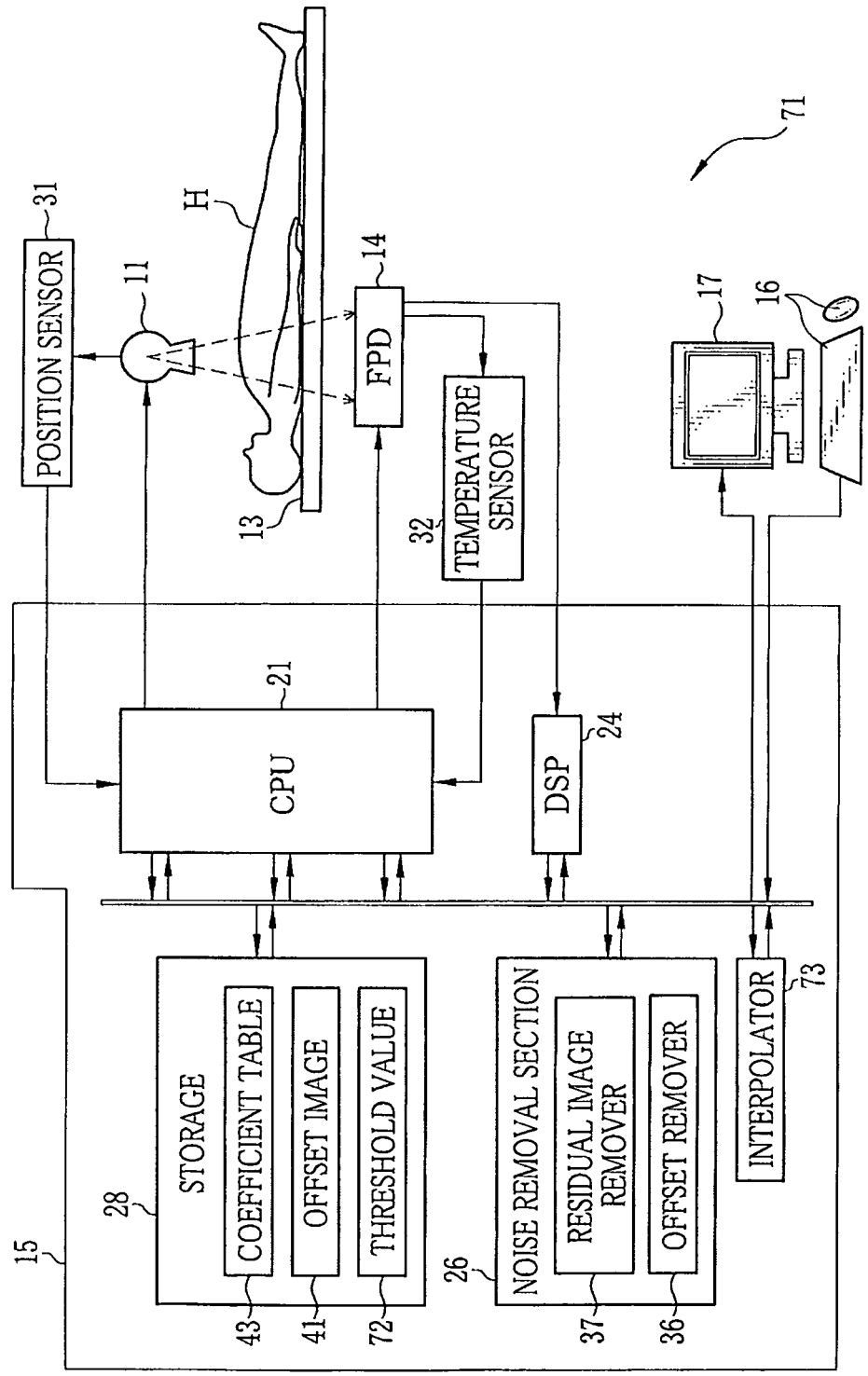
FIG. 15 is a block diagram showing an electrical configuration of an X-ray imaging system of the second embodiment.

Unlike the first embodiment, in an X-ray imaging system 71 shown in FIG. 15, a threshold value 72 is previously stored in the storage 28. For the second and subsequent images taken after the startup of the X-ray imaging system 71, the threshold value 72 is compared with a difference (hereinafter referred to as FPD temperature difference) in the FPD temperature between the first and second exposures, and used by an interpolator 73.

Similar to the interpolator 27 in the first embodiment, the interpolator 73 calculates a coefficient corresponding to parameters of the second exposure based on an instruction from the residual image remover 37. In this embodiment, however, the interpolator 73 examines whether the storage time of the second exposure is changed from that of the first exposure. If the storage time is unchanged, an FPD temperature difference between the first and second exposures is calculated, and compared with the threshold value 72.

In a case where the FPD temperature difference is larger than the threshold value 72, and a coefficient corresponding to the FPD temperature of the second exposure is not contained in the coefficient table 43, the interpolator 73 calculates a coefficient corresponding to the parameters of the second exposure. On the other hand, in a case where the FPD temperature difference is equal to or less than the threshold value 72, the interpolator 73 does not calculate a coefficient. Instead, the coefficient calculated for the first exposure is output to the residual image remover 37. In a case where the storage time of the second exposure is changed from that of the first exposure, the interpolator 73 calculates a coefficient corresponding to the parameters of the second exposure as in the first embodiment regardless of the FPD temperature difference.

In a case where the coefficient is calculated, the interpolator 73 additionally writes the calculated coefficient to the coefficient table 43. In addition to the calculated coefficient (for example, the coefficient in FIG. 9) used by the residual image remover 37, the interpolator 73 additionally writes intermediately calculated coefficients (for example, D1 to D4 in FIG. 9 and E1 to E5 in FIG. 12) to the coefficient table 43.

Figure 16:
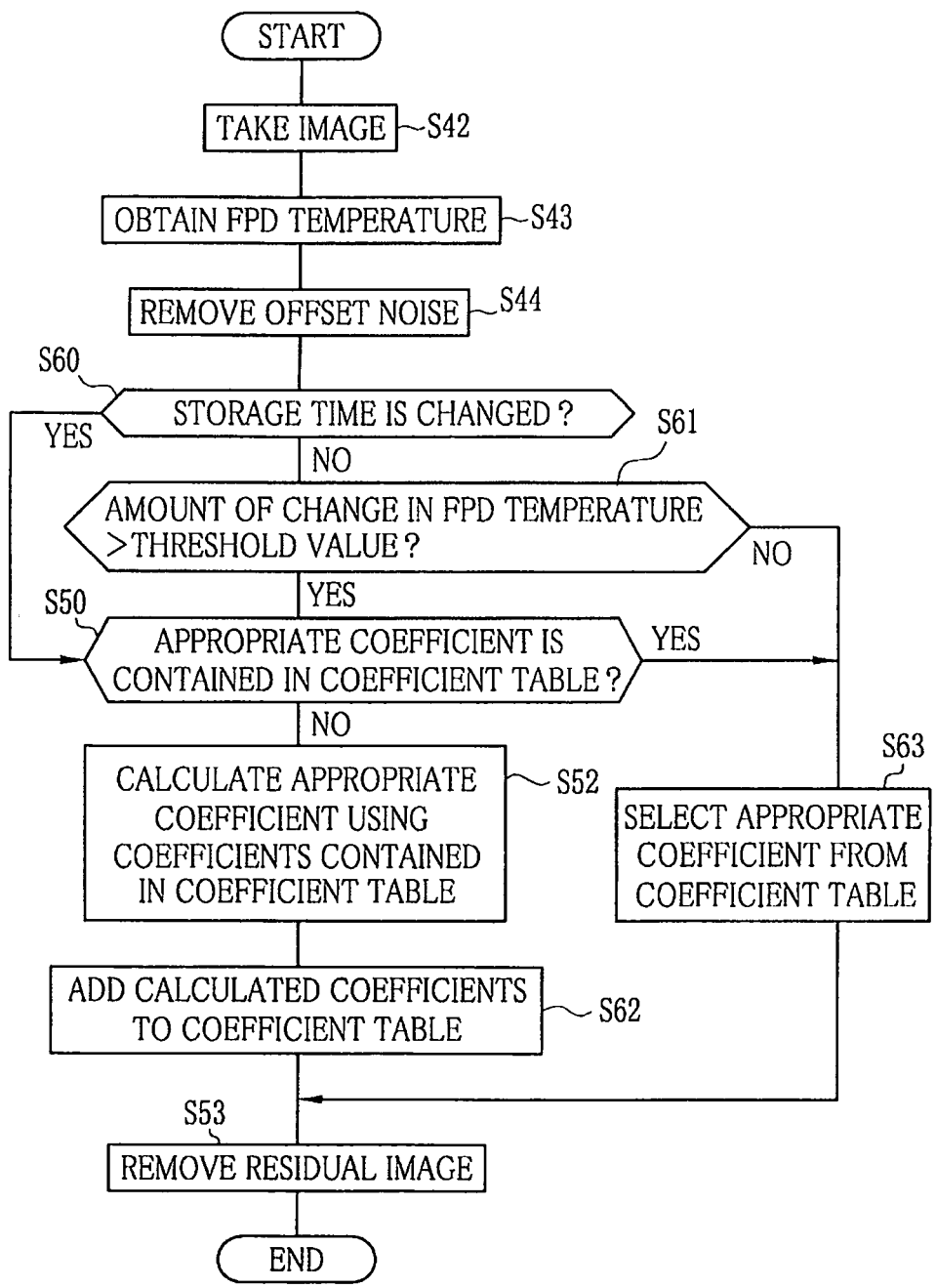
FIG. 16 is a flowchart showing operations of the X-ray imaging system of the second embodiment.

In FIG. 16, in the X-ray imaging system 71, an image of the patient H is taken through the same steps (S40 to S42) as those of the X-ray imaging system 10 of the first embodiment shown in FIG. 6. The offset noise is removed from the taken image (S44) as also shown in the FIG. 6.

Unlike the X-ray imaging system 10 of the first embodiment, the residual image is removed through the following steps into which the FPD temperature difference is taken into consideration. After the offset noise is removed from the taken image (S44) as described above, the interpolator 73 checks whether the storage time of the second exposure is changed from that of the first exposure (S60). In a case where the storage time is changed, it is checked whether a coefficient corresponding to the parameters of the second exposure is contained in the coefficient table (S50) as in the first embodiment. In a case where the appropriate coefficient is contained in the coefficient table 43, the appropriate coefficient is selected from the coefficient table (S63). In a case where the appropriate coefficient is not contained in the coefficient table 43, the residual image remover 37 makes the interpolator 73 calculate a coefficient corresponding to the parameters of the second exposure (S52). Unlike the first embodiment, the interpolator 73 additionally writes the calculated coefficient and the intermediately calculated coefficients to the coefficient table 43 (S62).

On the other hand, in a case where the storage time of the second exposure is unchanged from that of the first exposure, the interpolator 73 calculates the FPD temperature difference between the first and second exposures and compares the calculated FPD temperature difference with the threshold value 72 (S61).

In a case where the FPD temperature difference is larger than the threshold value 72, it is checked whether an appropriate coefficient corresponding to the parameters of the second exposure is contained in the coefficient table 43 (S50) as in the first embodiment. In a case where the appropriate coefficient is contained in the coefficient table 43, the appropriate coefficient is selected from the coefficient table 43 (S63). In a case where the appropriate coefficient is not contained in the coefficient table 43, a coefficient corresponding to the parameters of the second exposure is calculated (S52) as in the first embodiment. The interpolator 73 additionally writes the calculated coefficient and intermediately calculated coefficients to the coefficient table 43 (S62). The selected or calculated coefficient is output to the residual image remover 37 and the residual image of the first image is removed from the second image (S53).

On the other hand, in a case where the FPD temperature difference is equal to or less than the threshold value 72, the interpolator 73 does not calculate a coefficient. Instead, a coefficient used for the previous image (first image) is selected from the coefficient table 43 and output to the residual image remover 37 (S63). The residual image remover 37 uses the selected coefficient and removes the residual image as in the first embodiment (S53).

As described above, in a case where the storage time is not changed between the first and second exposures, the X-ray imaging system 71 calculates an appropriate coefficient only when the FPD temperature difference is larger than the threshold value 72 and the appropriate coefficient corresponding to the parameters of the second exposure is not contained in the coefficient table 43. Accordingly, the coefficient calculated for removing the residual image from the first image is again used for removing the residual image from the second image, without repeatedly calculating extremely close coefficients. Thus, operations of the image processing apparatus 15 are reduced in a case where images are taken successively in a fixed condition within a short time and where moving images are taken. The X-ray imaging system 71 of the present invention allows the use of the image processing apparatus 15 with small machine power.

In the first and second embodiments, a coefficient corresponding to the parameters of the exposure is calculated by interpolation of the coefficients contained in the coefficient table 43. Linear or nonlinear interpolation may be used for the calculation of the coefficient.

In the first and second embodiments, the interpolators 27 and 73 calculate the coefficients. The residual image remover 37 calculates the amount of the residual image by multiplying the first image by the attenuation factor (residual noise level) calculated from the coefficient, and subtracts the amount of the residual image from the second image. Alternatively, the interpolators 27 and 73 may calculate the amount or component of the residual image in addition to the coefficients. In this case, the residual image remover 37 subtracts the amount of the residual image from the second image.

In the first and second embodiments, the first image and the second image are taken successively, and the residual image of the first image is subtracted from the second image. In a case where three or more images are taken successively, the last image is superimposed with residual images of the previous images. In this case, it is preferable to remove the residual images from the last image in the same manner as described in the first and second embodiments.

In the first and second embodiments, the coefficient is calculated based on two parameters, the storage time and the FPD temperature, as an example. The coefficient may be calculated based on a single parameter, such as the storage time or the FPD temperature. In a case where the coefficient varies based on one or more parameters other than the storage time and the PFD temperature, for example, the number of exposures, the time elapsed from the startup of the X-ray imaging system, the X-ray tube voltage, the X-ray tube current and the like, it is preferable to calculate coefficients corresponding to such parameter(s) as in the first and the second embodiments.

For example, in a case where a coefficient varies depending on a tube voltage (radiation quality) and a tube current (dose), the coefficients corresponding to various tube voltages and tube currents are previously stored in the coefficient table. With referring to the coefficient table, a coefficient corresponding to the tube voltage and the tube current, obtained as parameters of the exposure, is selected or interpolated as in the first and second embodiments.

In the above first and second embodiments, the offset noise is treated as a constant noise component based on the premise that it does not change with the FPD temperature. However, in a case where the offset noise changes with the FPD temperature or the like, a plurality of coefficients, corresponding to the parameters of the exposure such as the FPD temperature, may be prepared during the calibration. An appropriate coefficient may be calculated by interpolation of the prepared coefficients, and an attenuation factor may be calculated using the calculated coefficient, and the offset noise is removed using the coefficient and the attenuation factor as in the case of removing the residual image described in the first and second embodiments.

Figure 17:
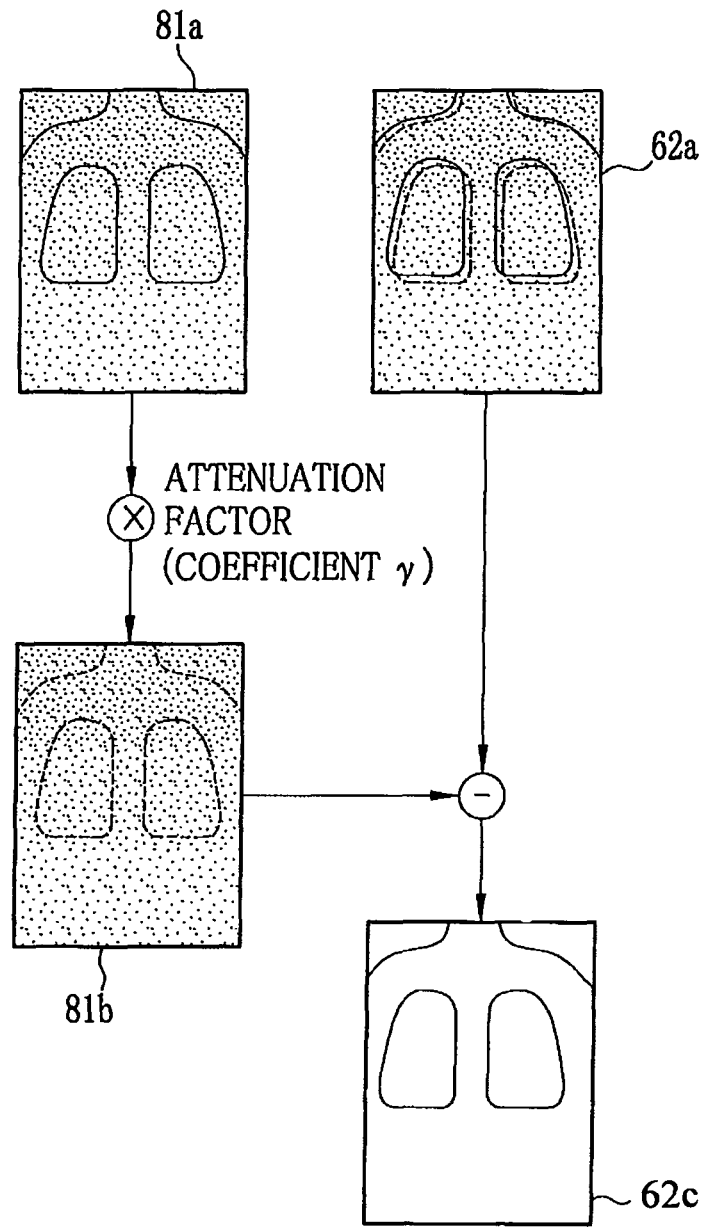
FIG. 17 is an explanatory view showing an example in which offset noise and a residual image are removed at the same time.

In the first and second embodiments, the offset noise and the residual image are clearly distinguished, and the offset noise and the residual image are removed separately. Alternatively, the offset noise and the residual image may be removed at the same time. For example, as shown in FIG. 17, a first image 81a containing the offset noise and the residual image is multiplied by an attenuation factor calculated as in the first and second embodiments to generate an image 81b representing a noise component. The image 81b is subtracted from the second image 62a. Thus, the noise-free image 62c is generated by removing the offset noise and the residual image from the second image 62a simultaneously. In the first and second embodiments, the residual image is removed after the removal of the offset noise. On the contrary, the residual image may be removed prior to the removal of the offset noise.

In the first and second embodiments, to remove the residual image of the first image superimposed on the second image, a component of the first image is directly subtracted from a component of the second image as an example. Alternatively, a dark image may be acquired without X-ray irradiation just before the second exposure. The dark image is used as the first image of the first and second embodiment. The residual image of the dark image is removed from the second image from which the offset noise is removed. The dark image acquired just before the second exposure contains the offset noise and the residual image of the first image. As with the first and second embodiments, the offset noise is removed from the acquired dark image. Then, the dark image is multiplied by an attenuation factor calculated based on the time interval Δt between the exposures of the dark image and the second image, and the product is subtracted from the second image. Thus, the residual image of the first image is subtracted from the second image. To remove the offset noise and the residual image at the same time, for example, a dark image is updated just before the second exposure. This dark image is used as the first image of the first and second embodiments to remove the offset noise and the residual image from the second image. Thus, the residual image superimposed on the second image is removed more accurately by using the dark image acquired just before the second exposure.

In the first and second embodiments, a single coefficient is applied across the FPD 14 on the premise that the FPD temperature is constant across the imaging surface of the FPD 14. Since the FPD 14 has a large imaging surface, the temperature therein may not be uniform. Therefore, it is preferable to divide the imaging surface and the image into multiple areas, and the residual image may be removed for each area as described in the first and second embodiments.

In the first and second embodiments, an X-ray imaging apparatus using an FPD is described as an example. The present invention is also applicable to other known imaging apparatuses for taking digital images, for example, an imaging plate. Of those, imaging apparatuses using amorphous selenium for the photoconductive layer such as the direct conversion FPD 14 described in the first and second embodiments are especially difficult to control the temperature. For this reason, the present invention is particularly effective for the direct conversion FPD 14.

In the first and second embodiments, the X-ray imaging apparatus that acquires transparent images is described as an example. The present invention is also applicable to CT apparatuses for acquiring tomographic images of patients and tomographic imaging apparatuses for acquiring tomographic images by tomosynthesis.

The radiographic imaging system of the present invention is excellent for use in taking moving images as well as successive still images.

In the first and second embodiments, the X-ray imaging system 10 and 71 each having the X-ray table 13 on which the patient H lies are described as examples. The present invention is also applicable to a stand type X-ray imaging system in which a patient is standing during the exposure and an X-ray imaging system for a long object.

In the first and second embodiments, the image processing apparatus 15 is provided separately from the FPD 14. Alternatively, a part of functions of the image processing apparatus 15 may be provided in the FPD 14 (or the X-ray imaging apparatus 12). The FPD 14 (the X-ray imaging apparatus 12) and the image processing apparatus 15 may be provided integrally.

In the first and second embodiments, X-rays are used as an example of radiation. The present invention is also applicable to a radiographic imaging apparatus using gamma rays or known corpuscular rays. In addition, the present invention is applicable to techniques for image processing, image correction, and noise cancellation with visible light or the like other than radiation.

In the first and second embodiments, a medical radiographic imaging apparatus is described as an example. The present invention is also applicable to industrial radiographic imaging apparatuses for use in so-called nondestructive inspections such as baggage inspection and internal defect inspection of metal materials. In particular, a residual image in a medical radiographic image may lead to an oversight of a lesion and an incorrect diagnosis. Therefore, the present invention is especially effective for use in medical radiographic imaging apparatuses.

Various changes and modifications are possible in the present invention and may be understood to be within the present invention.

What is claimed is:

1. An image processing apparatus for processing an image of a subject taken with an imaging device, said image processing apparatus comprising:

an image acquiring section configured to acquire a first image and a second image from said imaging device, said second image being taken subsequent to said first image;

a correction coefficient table containing a plurality of first correction coefficients, each of said plurality of first correction coefficients being used for determining an attenuation factor of a residual image of said first image superimposed on said second image, each of said plurality of first correction coefficients corresponding to a value of a predetermined parameter;

a parameter obtaining section configured to obtain a value of said parameter at an exposure of said second image;

an interpolator configured to calculate a second correction coefficient corresponding to said obtained parameter value by interpolating said plurality of first correction coefficients in a case where said correction coefficient table does not contain a correction coefficient corresponding to said obtained parameter value; and a residual image remover configured to calculate a residual image based on a time lapse between an exposure of said first image and an exposure of said second image and one of said plurality of first correction coefficients or said second correction coefficient corresponding to said obtained parameter value, to remove said residual image from said second image.

2. The image processing apparatus of claim 1, wherein said predetermined parameter is composed of a first parameter and a second parameter different from each other, and wherein said interpolator interpolates said second correction coefficient based on said first and said second parameters.

3. The image processing apparatus of claim 2, wherein said interpolator fixes a value of said first parameter and changes values of said second parameter to obtain a data string of said plurality of first correction coefficients corresponding to said changed values of said second parameter, and performs one-dimensional interpolation to calculate said second correction coefficient corresponding to a value of said second parameter at said exposure of said second image based on said data string.

4. The image processing apparatus of claim 2, wherein said interpolator performs two-dimensional interpolation using said plurality of first correction coefficients corresponding to parameter values close to said a plurality of obtained parameter values.

5. The image processing apparatus of claim 2, wherein one of said first parameter and said second parameter is information of an environmental condition or an exposure condition.

6. The image processing apparatus of claim 5, wherein said environmental condition includes a temperature of said imaging device.

7. The image processing apparatus of claim 6, wherein in a case where said correction coefficient table does not contain a first correction coefficient corresponding to said temperature of said imaging device at said exposure of said second image, said interpolator compares a temperature difference of said imaging device between said exposure of said first image and said exposure of said second image with a predetermined threshold value, and said interpolator calculates said second correction coefficient corresponding to said temperature of said imaging device at said exposure of said second image in a case where said temperature difference is larger than said threshold value, and said interpolator uses a first correction coefficient corresponding to said temperature of said imaging device at said exposure of said first image in a case where said temperature difference is equal to or smaller than said threshold value.

8. The image processing apparatus of claim 7, wherein said imaging device is a direct-conversion flat panel detector having a photoconductive layer that directly converts radiation into electrical charge.

9. The image processing apparatus of claim 5, wherein said exposure condition includes a storage time of said imaging device.

10. The image processing apparatus of claim 1, wherein said interpolator additionally writes said calculated second correction coefficient to said correction coefficient table.

11. An image processing method for processing an image of a subject taken with an imaging device, said image processing method comprising the steps of:

acquiring a first image and a second image from said imaging device, said second image being taken subsequent to said first image;

obtaining a parameter value of an exposure of said second image;

referring to a correction coefficient table in which a plurality of first correction coefficients, used for determining an attenuation factor of a residual image of said first image superimposed on said second image, are previously stored, and checking if said correction coefficient table contains a first correction coefficient corresponding to said obtained parameter value;

calculating a second correction coefficient corresponding to said obtained parameter value by interpolation of said plurality of first correction coefficients in a case where said correction coefficient table does not contain a first correction coefficient corresponding to said obtained parameter value; and calculating a residual image based on a time lapse between an exposure of said first image and an exposure of said second image and one of said plurality of first correction coefficients or said second coefficient corresponding to said obtained parameter value, to remove said residual image from said second image.

* * * * *